United States Patent [19]

Pherigo

[11] Patent Number: 5,052,572
[45] Date of Patent: Oct. 1, 1991

[54] TAMPER-EVIDENT CLOSURE WITH IMPROVED TEAR STRIP HOLD-DOWN

[75] Inventor: Douglas E. Pherigo, Loves Park, Ill.

[73] Assignee: J. L. Clark, Inc., Rockford, Ill.

[21] Appl. No.: 571,519

[22] Filed: Aug. 24, 1990

[51] Int. Cl.⁵ ............................................. B65D 17/34
[52] U.S. Cl. ..................................... 220/270; 220/266; 220/339; 220/359; 222/153; 222/541
[58] Field of Search .............. 220/214, 266, 270, 339, 220/359; 222/153, 541; 215/232, 235, 237, 254

[56] References Cited

U.S. PATENT DOCUMENTS

| | | | |
|---|---|---|---|
| 3,675,812 | 7/1972 | Foster | 220/337 |
| 4,361,250 | 11/1982 | Foster | 220/266 |
| 4,434,907 | 3/1984 | Ingemann | 220/276 |
| 4,463,869 | 8/1984 | Lewis | 220/307 |
| 4,529,100 | 7/1985 | Ingemann | 220/359 |
| 4,592,480 | 6/1986 | Hart et al. | 220/270 |
| 4,610,371 | 9/1986 | Karkiewicz | 220/266 |
| 4,621,744 | 11/1986 | Foster | 220/270 |
| 4,640,427 | 2/1987 | Marino et al. | 215/232 |
| 4,658,980 | 4/1987 | Lindstrom | 220/214 |

Primary Examiner—Stephen Marcus
Assistant Examiner—Stephen Cronin
Attorney, Agent, or Firm—Leydig, Voit & Mayer, Ltd.

[57] ABSTRACT

The hinged flap of a plastic container closure is molded while in an open position and, during molding of the flap, an elongated tear-away strip is formed along the front edge of the flap and is integrally connected to the flap by tearable webs. After the newly molded flap has first been closed, the strip is anchored releasably to the top panel of the closure and prevents the flap from opening during shipment of the container, the strip also serving as a visual indicator that the seal of the closure is intact. Anchoring of the strip is effected by pins which project upwardly from the panel and which are ultrasonically welded to the lower side of the strip. The closure is opened by lifting and pulling on the strip to break the welds at the pins and thereby enable the strip to be torn completely away from the top panel and the flap and to free the flap for swinging to an open position. The absence of the strip or the presence of a partially torn strip indicates that tampering has occurred and that the seal may not be intact.

3 Claims, 2 Drawing Sheets

TAMPER-EVIDENT CLOSURE WITH IMPROVED TEAR STRIP HOLD-DOWN

BACKGROUND OF THE INVENTION

This invention relates to a container closure of the type in which at least one flap is integrally hinged to the top panel of the closure and is adapted to be swung upwardly and downwardly to open and close a dispensing opening which is formed through the top panel. More specifically, the invention relates to a closure of the type in which means hold the flap securely in its closed position until the container is first opened and, at the same time, provide a visual indication as to whether the container has been tampered with and opened prior to purchase by the consumer. Such a closure is commonly referred to as being a tamper-evident closure.

A closure of this general type is disclosed in Foster U.S. Pat. No. 4,621,744. In that closure, a tear-away strip extends along the front edge of the closure flap and is connected to such edge by frangible webs. The tear strip is anchored releasably to the top panel of the closure and normally holds the flap in its closed position to preserve the integrity of the seal and to provide a clear indication that the container is of the tamper-evident type. By pulling upwardly on one end of the strip, the latter may be torn away from the panel and the flap to permit opening of the flap. If the strip is partially torn or is absent, the consumer is warned that the original seal may not be intact.

While the tamper-evident feature of the closure of the aforementioned Foster patent is effective, it is somewhat complex in that pins which are molded integrally with the top panel project upwardly through openings formed through the strip. After the closure has been molded and the flap has first been closed, it is necessary to heat stake the upper ends of the pins to cause the pins to mushroom over and captivate the strip downwardly against the panel. Moreover, it is necessary to provide tear-away buttons in the openings in the strip in order to insure tearing away of the strip.

SUMMARY OF THE INVENTION

The general aim of the present invention is to provide a new and improved tamper-evident closure which is easier and less costly to manufacture than prior closures of the same general type.

A more detailed object of the invention is to achieve the foregoing by providing a closure in which the upper end portions of hold-down pins are simply welded to the underside of a tear strip in order to avoid the need of forming special openings through the strip and to avoid the need of staking the upper ends of the pins to lock the strip to the pins.

These and other objects and advantages of the invention will become more apparent from the following detailed description when taken in conjunction with the accompanying drawings.

DETAILED DESCRIPTION OF THE PREFERRED EMBODIMENT

Figure 1:
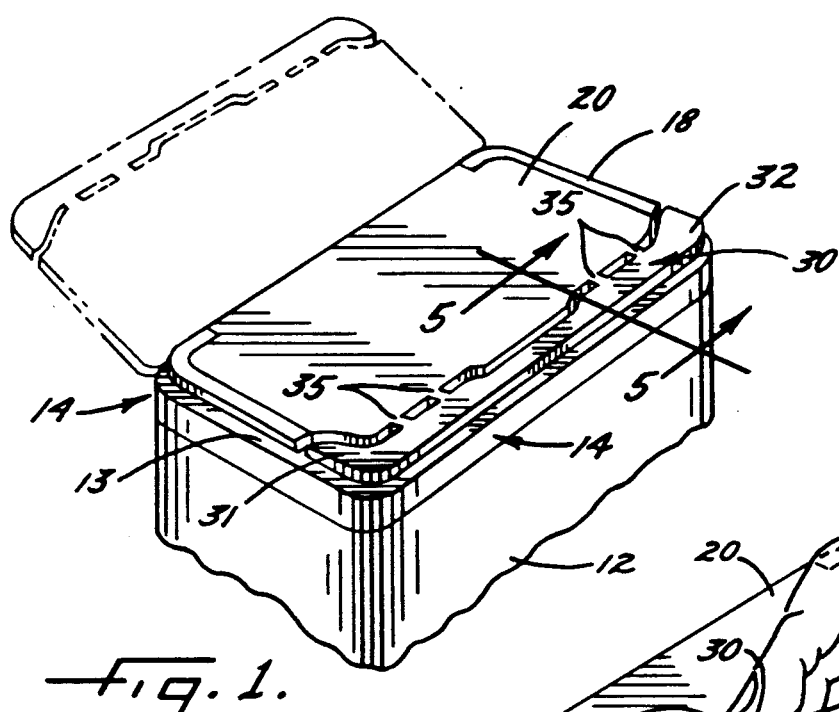
FIG. 1 is a fragmentary perspective view of a container equipped with a new and improved closure incorporating the unique features of the present invention, the closure being shown in its original unopened condition.
Figure 2:
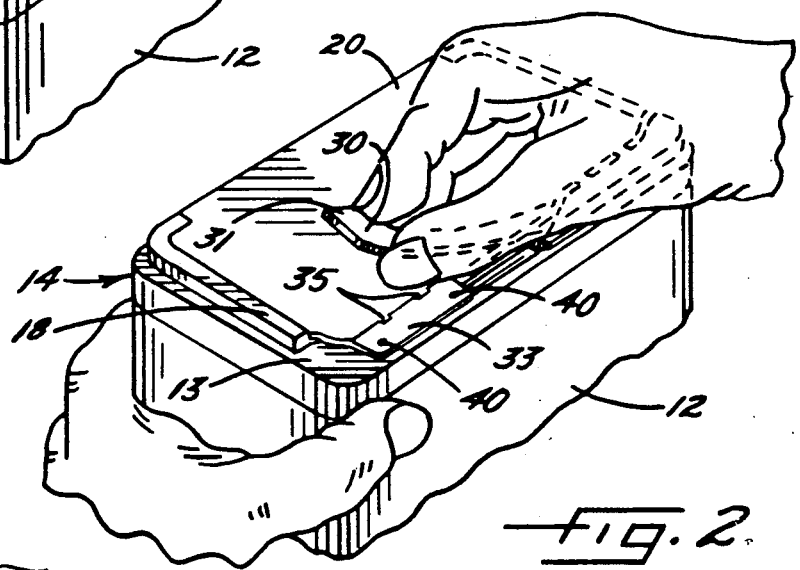
FIG. 2 is a view similar to FIG. 1 but shows the first step of opening the closure.

As shown in the drawings for purposes if illustration, the invention is embodied in a closure 11 for a container such as a metal spice can 12 which, in this instance, is of rectangular cross-section. The closure comprises a generally rectangular cover injection molded from suitable plastic such as polypropylene and defined by a horizontal top panel 13. A skirt 14 is molded integrally with and depends from the top panel adjacent the periphery thereof and telescopes snugly with the upper end portion of the can 12.

Formed through the top panel is a dispensing opening 15 which may be of any desired shape. In the area immediately surrounding the sides of the opening, the panel is formed with a raised rib 18. As a result, the panel includes a relieved area around the periphery of the rib so as to enable the bottom of another can to stack with the closure 11.

The opening 15 is adapted to be closed by a flap 20. The flap is molded integrally with the top panel 13 and is swingably connected to the top panel along a hinge 23 whose axis extends parallel to the front edge of the flap. The hinge 23 is formed by holding spaced sections of plastic along the junction between the top panel and the flap. A depending rib 24 having the same shape as the opening 15 is molded integrally with the underside of the flap 20 and is adapted to telescope into and seal the opening when the flap is swung to its closed position.

The flap 20 is molded while in an inclined position (see FIG. 3) as disclosed substantially in Foster U.S. Pat. No. 3,675,812 and is first closed after the closure 11 has been ejected from the molding dies. As disclosed in the aforementioned Foster patent, an elongated tear-away strip 30 is molded integrally with the front edge of the flap, is releasably anchored to the top panel 13 and initially locks the flap to the panel to hold the flap in its closed position. To open the closure 11, the strip 30 is torn away from the panel and the flap and frees the flap to swing to its open position. The presence of the tear strip provides an indication that the closure is of the tamper-resistant type and discourages innocent opening of the closure while the absence of the strip indicates that tampering has occurred and that the seal may not be intact.

More specifically, the strip 30 extends parallel to the axis of the hinge 23 and is sufficiently long to extend along the entire length of the front edge of the flap 20. The strip is spaced forwardly from the front edge of the flap by a short distance (e.g., 1/32") and is formed with two integral end tabs 31 and 32 (FIG. 1). The tabs 31 and 32 project rearwardly from the strip and lie alongside the outboard side edges of the flap 20. The strip and the tabs are approximately the same thickness as the front edge portion of the flap and lie in the same plane as the front edge portion of the flap. A raised ridge 33 at the front of the opening 15 engages the underside of the strip 30 and the underside of the flap 20 to keep the upper side of the flap flush with the rib 18.

The strip 30 is connected to the front edge of the flap 20 by weakened web means which permit the strip to be torn away from the flaps. Herein, the web means are in the form of four narrow webs 35 (FIG. 1) spaced along the strip and molded integrally with the flap and the strip so as to extend between the same. The webs normally hold the flap and the strip in connected relation but are sufficiently thin and weak to tear and permit the strip to be torn away from the flap. When the closure 11 is molded, plastic is injected directly into the die cavities for the flap. The small die cavities which serve to form the webs 35 also act as gates to permit plastic to flow from the flap area to the strip area and thereby form the strip.

Figure 4:
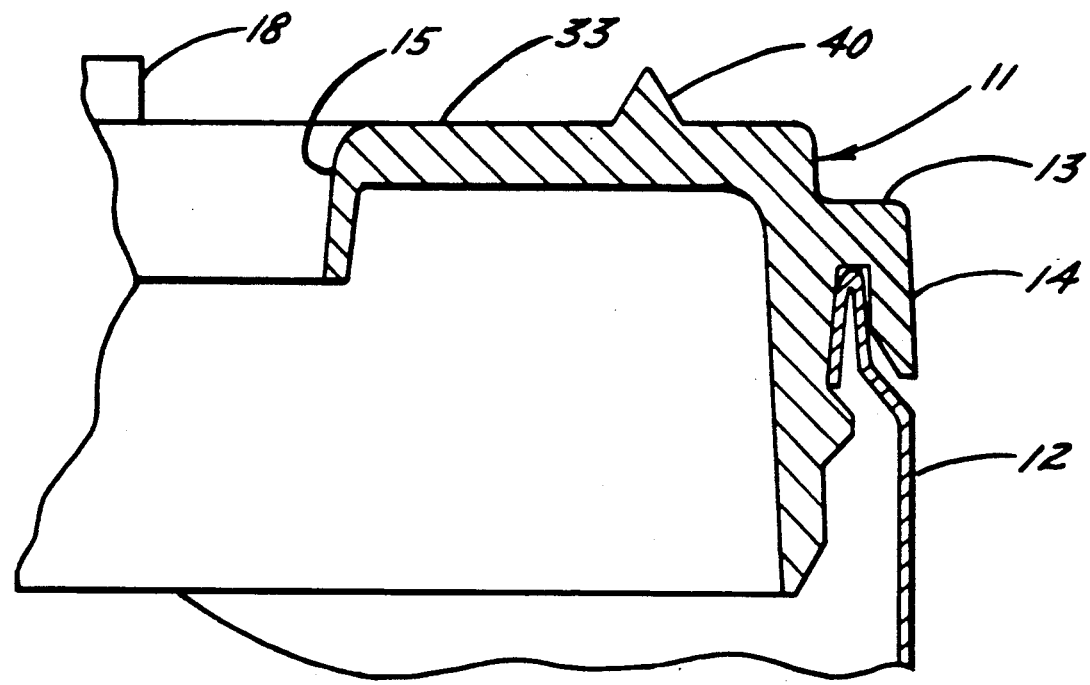
FIG. 4 is an enlarged fragmentary cross-section of the container as taken substantially along the line 4—4 of FIG. 3.
Figure 5:
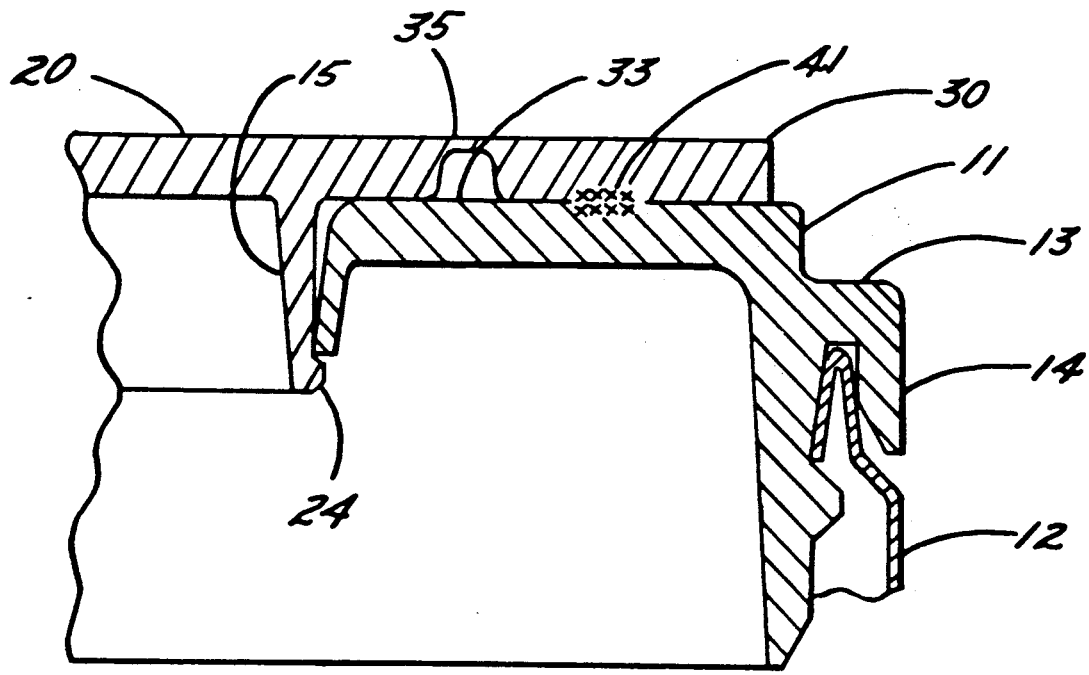
FIG. 5 is an enlarged fragmentary cross-section of the container as taken substantially along the line 5—5 of FIG. 1.

In accordance with the present invention, novel means are provided for anchoring the tear strip 30 to the top panel 13 in an extremely simple manner while permitting the strip to be torn away from the panel as an incident to intentional opening of the closure 11. Herein, these means comprise a series (e.g., four) of upwardly projecting and generally conical pins 40 (FIGS. 3 to 5) molded integrally with and spaced along the front portion of the ridge 33 of the top panel 13. After the closure 11 has been molded, the flap 20 is swung closed and the lower side of the tear strip 30 is pressed against the upper ends of the pins 40. Thereafter, the closure 11 is subjected to ultrasonic energy to heat the pins and to overlying portions of the strip and to cause the plastic of the pins to fuse to the plastic of the strip and form welds indicated generally at 41 (FIG. 5).

With the foregoing arrangement, the welds 41 between the strip 30 and the pins 40 normally lock the flap 20 in its closed position. When the strip 30 is properly in place on the closure 11, the strip serves as a clear indicator that the closure is of the tamper-evident type and thus well-meaning potential purchasers are warned against innocently attempting to open the closure while the container 12 is on a retail shelf. The closure may be opened by the purchaser by grasping either of the tabs 31 and 32 and by lifting upwardly on the strip while pulling the strip along the length of the panel. As a result of such lifting and pulling, the strip tears away from the pins 40 as the welds 41 tear and break and, at the same time, the strip tears away from the flap 20 as permitted by the thin webs 35. Accordingly, the strip 30 is completely separated from the closure 11 and may be thrown away. Once the strip has been removed, the flap is no longer tied to the panel 13 and thus may be freely opened.

If the strip 30 is partially torn or completely removed while the container 12 is on the shelf, the container will appear significantly different from neighboring containers and thus the customer will be warned that tampering has occurred. In addition, the torn webs 35 provide visual evidence of tampering.

Figure 3:
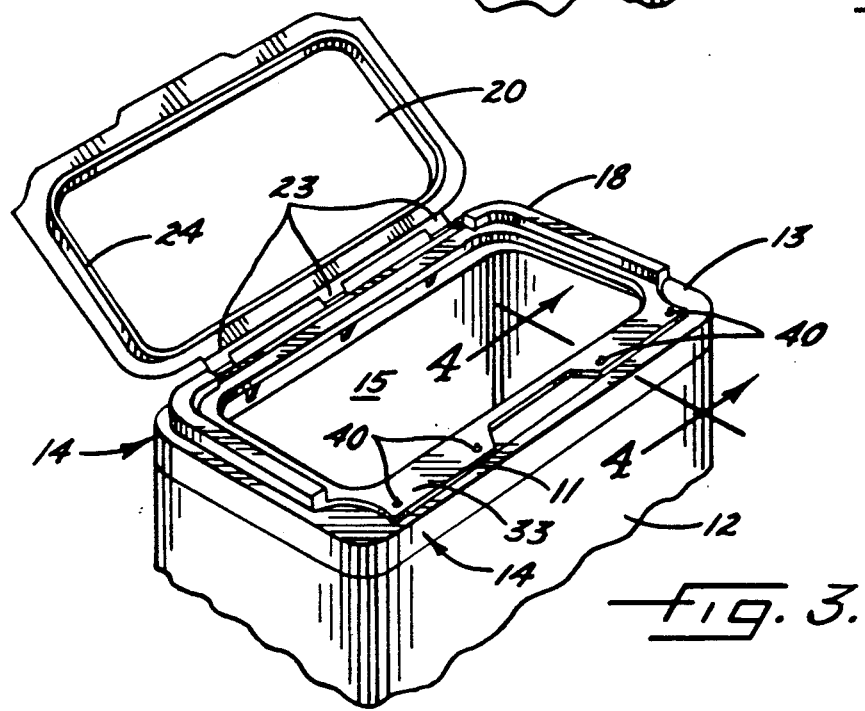
FIG. 3 also is a view similar to FIG. 1 but shows the flap of the closure in an open position.

The closure 11 is constructed so as to be aesthetically attractive. Thus, the tear strip 30 is flush with the upper side of the flap 20 and is disposed entirely within the confines of the periphery of the top panel 13 so as to not interfere with the stacking capability of the container. To enable easy access to the strip and the lift tabs 31 and 32, the ridge 33 is relieved below the tabs 31 and 32 as shown in FIG. 3 so as to enable a thumbnail to be placed beneath the tabs.

From the foregoing, it will be apparent that the present invention brings to the art a new and improved closure 11 in which the strip 30 is locked against the ridge 33 of the panel 13 simply by subjecting the strip and the pins 40 to an ultrasonic welding operation. As a result, there is no need to form special openings in the strip or to stake the ends of the pins. Thus, the closure is simpler and less expensive to manufacture than prior closures of the same general type.

Those familiar with the art will appreciate that the strip 30 could be formed with depending pins whose lower ends are ultrasonically welded to the upper side of the ridge 33 of the panel 13. That arrangement is not preferred, however, since shrink marks tend to appear in the upper side of the strip immediately above the pins.

I claim:

1. A container closure comprising a top panel piece molded of plastic, a dispensing opening formed through said panel piece, a flap molded integrally with said panel piece along a hinge line and swingable upwardly and downwardly about said hinge line and relative to said panel piece between open and closed positions with respect to said dispensing opening, said flap having a front edge extending generally parallel to said hinge line, an elongated plastic strip piece extending alongside and spaced forwardly from the front edge of said flap and overlying said panel piece when said flap is in said closed position, tearable webs molded integrally with and spaced along said strip piece and the front edge of said flap and extending between the two upright plastic pins molded integrally with one of said pieces and connected to the other of said pieces by welds formed by heating said pieces and causing portions of said pins and portions of said other piece to fuse together, said welds being sufficiently strong to normally hold said strip piece and said flap downwardly against said panel piece but sufficiently weak to break in response to an upwardly lifting force applied to one end portion of said strip piece whereby said strip piece may be lifted upwardly from said panel piece and torn away from the front edge of said flap at said webs thereby to enable the flap to be swung upwardly to its open position.

2. A container closure as defined in claim 1 in which said pins are formed integrally with and project upwardly from said panel piece.

3. A container closure comprising a top panel molded of plastic, a dispensing opening formed through said panel, a flap molded integrally with said panel along a hinge line and swingable upwardly and downwardly about said hinge line and relative to said panel between open and closed positions with respect to said dispensing opening, said flap having a front edge extending generally parallel to said hinge line, an elongated plastic strip extending alongside and spaced forwardly from the front edges of said flap, said strip being disposed in the plane of said flap and overlying said panel when said flap is in said closed position, tearable webs molded integrally with and spaced along said strip and the front edge of said flap and extending between the two, upright plastic pins molded integrally with said panel and projecting upwardly therefrom, said pins terminating short of the upper side of said strip and being connected to said strip by welds formed by heating said closure and causing the upper end portions of said pins and the overlying portions of said strip to fuse together, said welds being sufficiently strong to normally hold said strip and said flap downwardly against said panel but sufficiently weak to break in response to an upward lifting force applied to one end portion of said strip whereby said strip may be lifted upwardly and torn away from said panel and from the front edge of said flap at said webs thereby to free the flap for upward swinging to its open position.

* * * * *